United States Patent [19]

Takeda et al.

[11] Patent Number: 5,083,024
[45] Date of Patent: Jan. 21, 1992

[54] DIGITAL X-RAY IMAGE READ APPARATUS WITH A CORRECTION FUNCTION

[75] Inventors: Shiro Takeda, Sagamihara; Fumihiro Namiki, Machida; Isamu Yamada, Kawasaki, all of Japan

[73] Assignee: Fujitsu Limited, Kawasaki, Japan

[21] Appl. No.: 591,805

[22] Filed: Oct. 2, 1990

[30] Foreign Application Priority Data

Oct. 2, 1989 [JP] Japan .................................. 1-255265

[51] Int. Cl.[5] .......................................... G01N 23/04
[52] U.S. Cl. ................................ 250/327.2; 250/484.1
[58] Field of Search ................. 250/327.2 C, 327.2 G, 250/484.1

[56] References Cited

U.S. PATENT DOCUMENTS

| | | | |
|---|---|---|---|
| 4,527,061 | 7/1985 | Horikawa et al. | 250/327.2 |
| 4,636,641 | 1/1987 | Mori et al. | 250/484.1 |
| 4,861,994 | 8/1989 | Saotome et al. | 250/327.2 |
| 4,916,316 | 4/1990 | Umemoto et al. | 250/327.2 |

FOREIGN PATENT DOCUMENTS 0126218 11/1984 European Pat. Off. .
62-18536 1/1987 Japan .

Primary Examiner—Janice A. Howell
Assistant Examiner—Richard Hanig
Attorney, Agent, or Firm—Staas & Halsey

[57] ABSTRACT

A digital X-ray image read apparatus having a correction function. The apparatus includes an excitation beam generation source for irradiating the excitation beam onto a photostimulable phosphor plate to generate a fluorescent light. A collection unit collects the fluorescent light of the photostimulable phosphor plate after excitation and a photomultiplier unit, connected to the collection unit, converts the fluorescent light to an analog electrical signal after multiplication. An analog-to-digital converter, connected to the photomultiplier unit, converts the analog electrical signal to a digital X-ray image signal. A correction unit, connected to the analog-to-digital converter, corrects the digital X-ray image based on a predetermined formula obtained from an amount of the fluorescent light and an afterglow thereof. An image memory connected to the correction unit, stores the X-ray image after correction.

2 Claims, 6 Drawing Sheets

DIGITAL X-RAY IMAGE READ APPARATUS WITH A CORRECTION FUNCTION

BACKGROUND OF THE INVENTION

1. Field of the Invention

The present invention relates to a digital X-ray image read apparatus, more particularly, it relates to a digital X-ray image read apparatus with a correction function for correcting an X-ray image after A/D conversion. A digital X-ray image read apparatus according to the present invention is mainly used in the field of medical equipment.

2. Description of the Related Art

An X-ray apparatus is widely used in various fields, particularly in the medical field. As a conventional X-ray apparatus having high sensitivity and high resolution, there is a digital X-ray image read apparatus that displays an X-ray image on a cathode-ray tube (CRT) instead of a radiograph.

The above conventional digital X-ray image read apparatus (see, for example, U.S. Pat. No. 3,859,527) uses a photostimulable phosphor plate constituted by a sheet-like fluorescence medium which is able to accumulate a part of the X-ray energy. This fluorescence medium accumulating the X-ray energy is called an "accumulative fluorescence body". The accumulative fluorescence body can accumulate X-ray energy for a relatively long time.

In general, a digital X-ray image can be obtained by the following steps. That is, when X-rays are irradiated onto an object (for example, a human body), the X-rays transmitted through the object expose the photostimulable phosphor plate. When the photostimulable phosphor plate is scanned by an excitation beam (for example, a laser beam), the energy accumulated on the fluorescence body is excited by the laser beam and a fluorescent light corresponding to the accumulated energy is emitted from the photostimulable phosphor plate.

The fluorescent light is collected by collection equipment, for example, bundled optical fibers, and converted to analog electrical signals by an optical-to-electrical converter. Further, the analog electrical signals are converted to digital signals to provide a digital X-ray image on the CRT.

Next, a doctor reads the X-ray image displayed on the CRT. This read operation by the doctor is called an "actual read". That is, the actual read, in this case, means that the doctor reads the X-ray image displayed on the monitor image when diagnosing the object. For the photographic conditions during the actual read, it is necessary to determine a supply voltage for an X-ray tube, a multiplication rate of a photomultiplier, an amplification rate of the amplifier, and a distance between the X-ray tube and the object.

There is, however, a problem in the above conventional system. This problem is the fact that the actual read operation must be performed many times when diagnosing the object. This problem is caused by an afterglow of the fluorescent light from the photostimulable phosphor plate. That is, the afterglow of the fluorescent light occurs for a long time just after the irradiation of the excitation beam is stopped.

In this case, since the amount of the fluorescent light at the irradiation of a subsequent excitation beam is defined by the sum of the fluorescent light at that time and the afterglow occurring in previous steps. Accordingly, it is difficult to determine the precise amount of fluorescent light at that time.

Accordingly, it is necessary to wait for a relatively long time until all afterglow attenuates to a predetermined light level.

SUMMARY OF THE INVENTION

The object of the present invention is to provide a digital X-ray image read apparatus with a correction function enabling correction of the X-ray image, and high speed reading of the X-ray image during the actual read operation when diagnosing an object.

In accordance with the present invention, there is provided a digital X-ray image read apparatus with a correction function, including: an excitation beam generation source for irradiating the excitation beam onto a photostimulable phosphor plate to generate a fluorescent light; a collection unit for collecting the fluorescent light of the photostimulable phosphor plate after excitation; a photomultiplier unit connected to the collection unit for converting the fluorescent light to an analog electrical signal after multiplication; an analog-to-digital converter operatively connected to the photomultiplier unit for converting the analog electrical signal to a digital X-ray image signal; a correction unit operatively connected to the analog-to-digital converter for correcting the digital X-ray image based on a predetermined formula obtained from an amount of the fluorescent light and an afterglow thereof; and an image memory operatively connected to the correction unit for storing the X-ray image after correction.

In one embodiment, the correction unit comprises a multiplication circuit for multiplying a constant value of $\exp(-\Delta t/\tau)$ by the X-ray image $S_{n-1}$, and a subtraction circuit for subtracting the resultant data $S_{n-1} \cdot \exp(-\Delta t/\tau)$ from the X-ray image ($S_n$) just after the X-ray image ($S_{n-1}$), and obtaining the corrected X-ray image ($Q_n$) based on the following formula:

$$Q_p = S_p - S_n \exp(-(t_p - t_n)/\tau)$$

where: $(t_n - t_p)$ denotes a time interval of samling.

DESCRIPTION OF THE PREFERRED EMBODIMENTS

Figure 1:
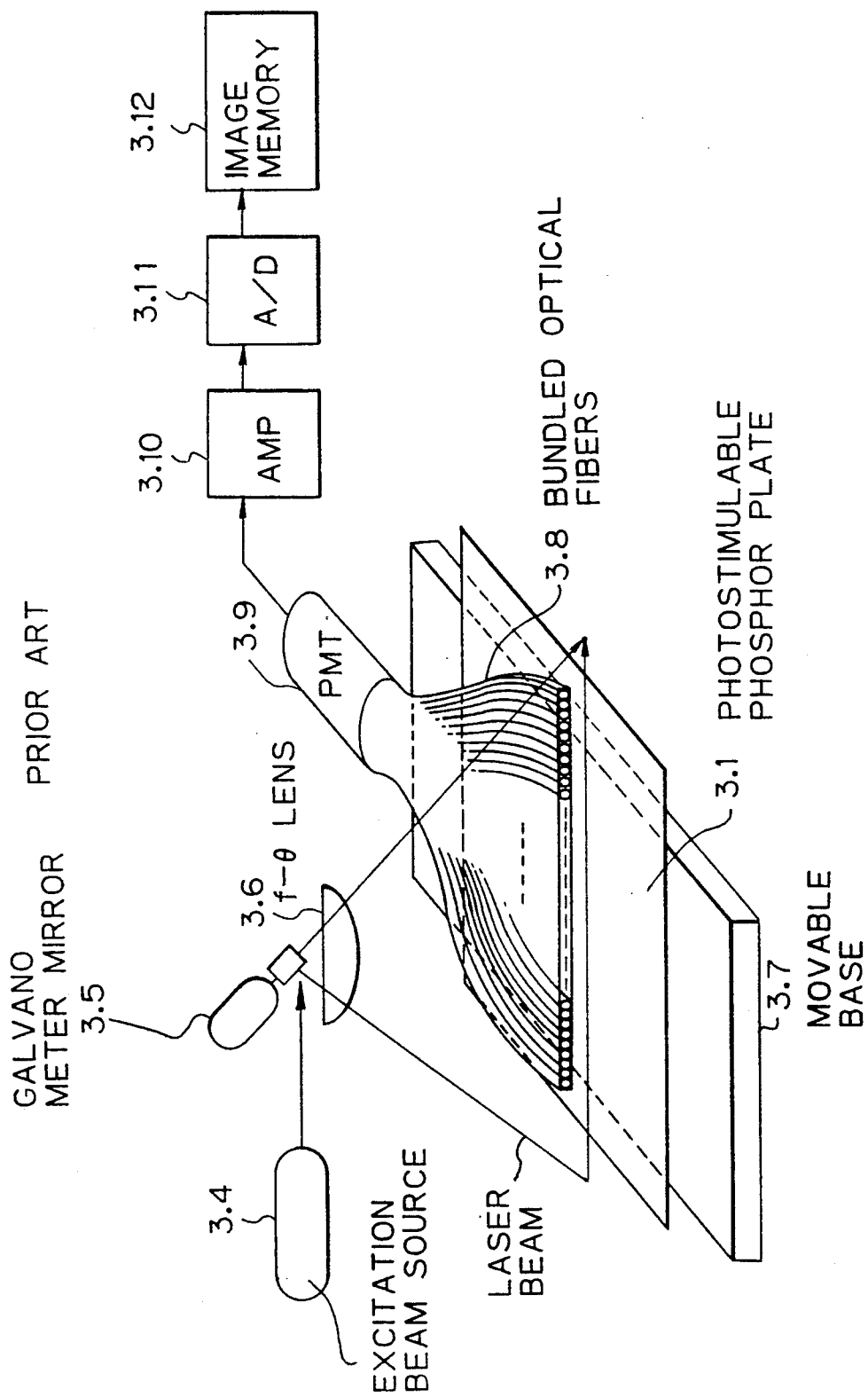
FIG. 1 is a basic structural view of a conventional digital X-ray image read apparatus.

FIG. 1 is a basic structural view of a conventional digital X-ray image processing apparatus. In FIG. 1, reference number 3.1 denotes a photostimulable phosphor plate or sheet, 3.4 an excitation beam source, 3.5 a galvanometer mirror, 3.6 an f-θ lens, 3.7 a movable base, 3.8 bundled optical fibers, 3.9 a photomultiplier (PMT), 3.10 an amplifier (AMP), 3.11 an A/D converter (A/D), and 3.12 an image memory.

When X-rays are irradiated onto the object 3.0 (see, FIG. 6), the X-rays transmitted through the object 3.0 expose the photostimulable phosphor plate 3.1. When the photostimulable phosphor plate 3.1 is scanned by an excitation beam (for example, a laser beam) emitted from the beam source 3.4 through the f-$\theta$ lens 3.6, the energy accumulated on the fluorescence body is excited by the laser beam and the fluorescent light corresponding to the accumulated energy is emitted from the photostimulable phosphor plate 3.1.

The fluorescent light is collected by collection equipment, for example, bundled optical fibers 3.8, and converted to an analog electrical signal by the photomultiplier 3.9. Further, the analog electrical signal is multiplied by the photomultiplier 3.9 and converted to digital signals by the A/D converter 3.11 to obtain the digital X-ray image on the CRT. The digital X-ray image is stored in the image memory 3.12.

Figure 2:
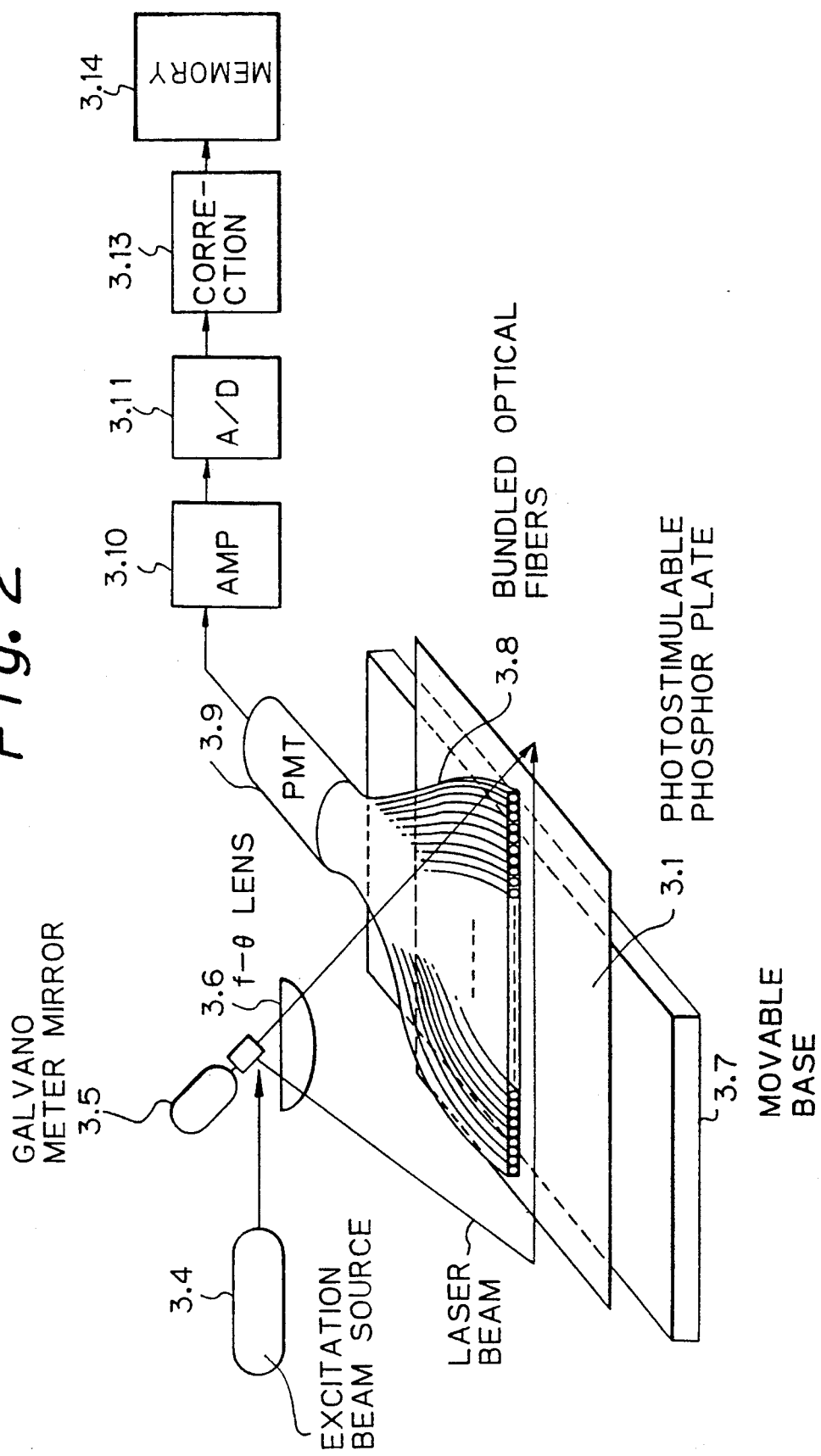
FIG. 2 is a basic structural view of a digital X-ray image read apparatus according to an embodiment of the present invention.

FIG. 2 is a basic structural view of a digital X-ray image read apparatus according to an embodiment of the present invention. In FIG. 2, the same reference numbers as shown in FIG. 1 are attached to the same components in FIG. 2. In this embodiment, reference number 3.13 denotes a correction unit for collecting the X-ray image, and 3.14 denotes an image memory. As shown in the drawing, the X-ray image after A/D conversion is corrected by the correction unit 3.13, and the corrected X-ray image is stored in the memory 3.14 as explained in detail below.

Figure 3:
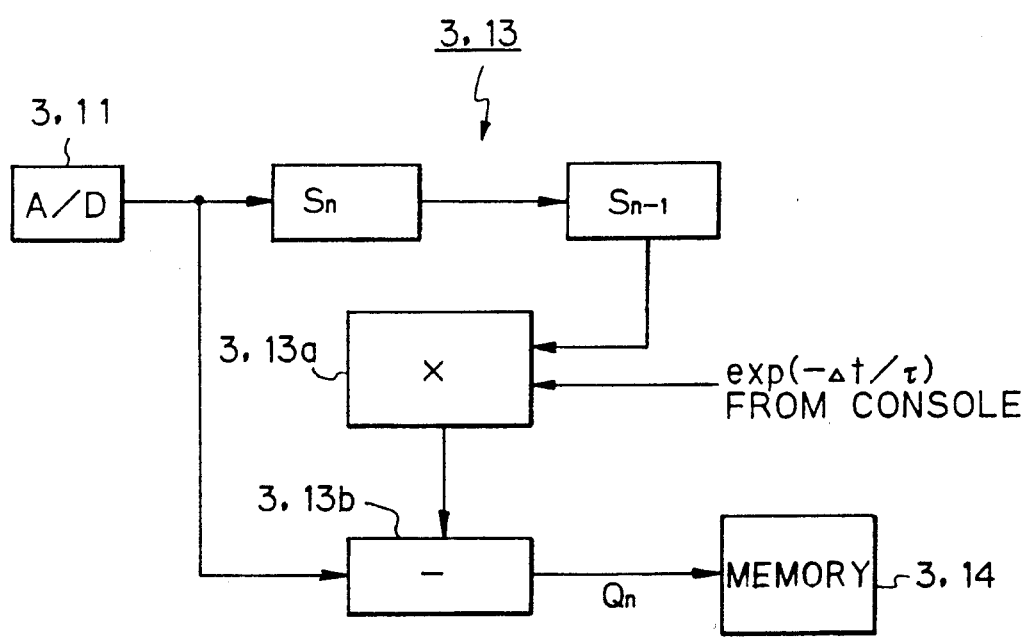
FIG. 3 is a detailed block diagram of correction unit shown in FIG. 2.

FIG. 3 is a detailed block diagram of the correction unit shown in FIG. 2; In FIG. 3, reference number 3.13a denotes a multiplication unit, and 3.13b denotes a subtraction unit. Further, $S_n$ and $S_{n-1}$ denotes shift registers storing image values converted by the A/D converter 3.11 after being detected by the photomultiplier (PMT) 3.9. Accordingly, each image value denotes the amount of the fluorescent light irradiated from the photostimulable phosphor plate 3.1 for every picture element. In this case, $S_{n-1}$ denotes the image value just before the image value $S_n$.

Further, $Q_n$ denotes an image value corrected by the formula "$exp(-\Delta t/\tau)$", and the corrected image value $Q_n$ is stored in the memory 3.14.

As shown in the drawing and explained in detail below, the correction of each image value is performed by multiplying the constant value $exp(-\Delta t/\tau)$ by the image value $S_{n-1}$, and by subtracting the resultant data $S_{n-1}exp(-\Delta t/\tau)$ from the image value $S_n$. As a result, the corrected image value $Q_n$ is obtained from the subtraction unit 3.13b.

Figure 4:
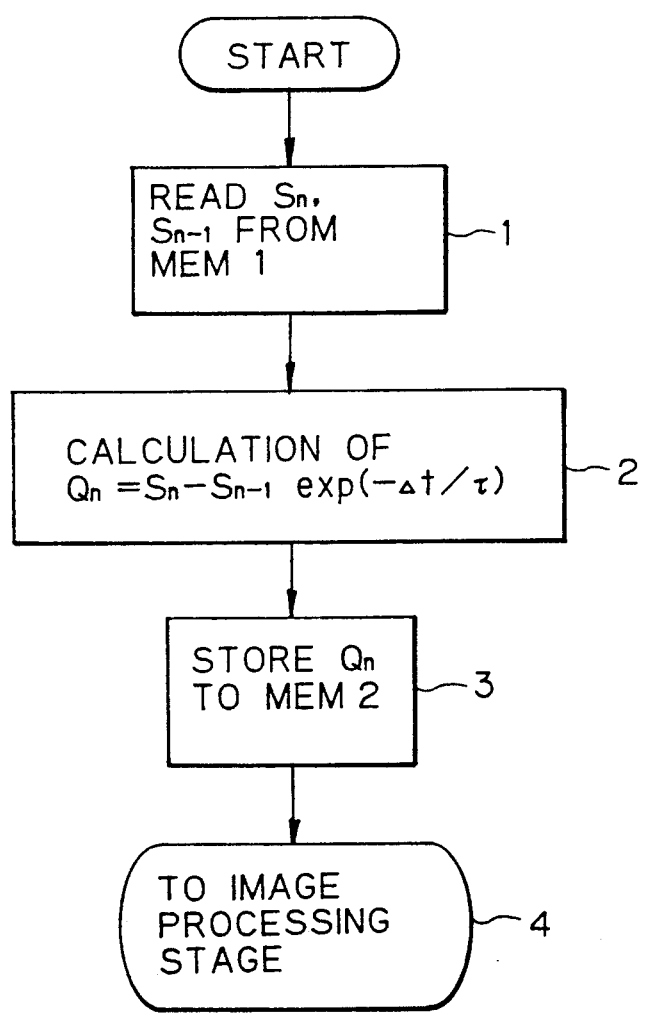
FIG. 4 is a basic flowchart of correction operation according to the present invention.

FIG. 4 is a basic flowchart of a correction operation according to the present invention. These calculations are performed by a shoftware in the correction unit 3.13 by using a microprocessor. In this case, the image memory 3.14 is divided into two areas (MEM1, MEM2).

In step 1, the image values $S_{n-1}$ and $S_n$ are read out from the image area MEM 1 (not shown).

In step 2, the calculation is performed in the multiplication unit 3.13a and the subtraction unit 3.13b to obtain the corrected value $Q_n$.

In step 3, the corrected value $Q_n$ is stored in the image area MEM 2 (not shown).

In step 4, the corrected value $Q_n$ is output to an after stage (not shown) performing image processing.

Figure 5:
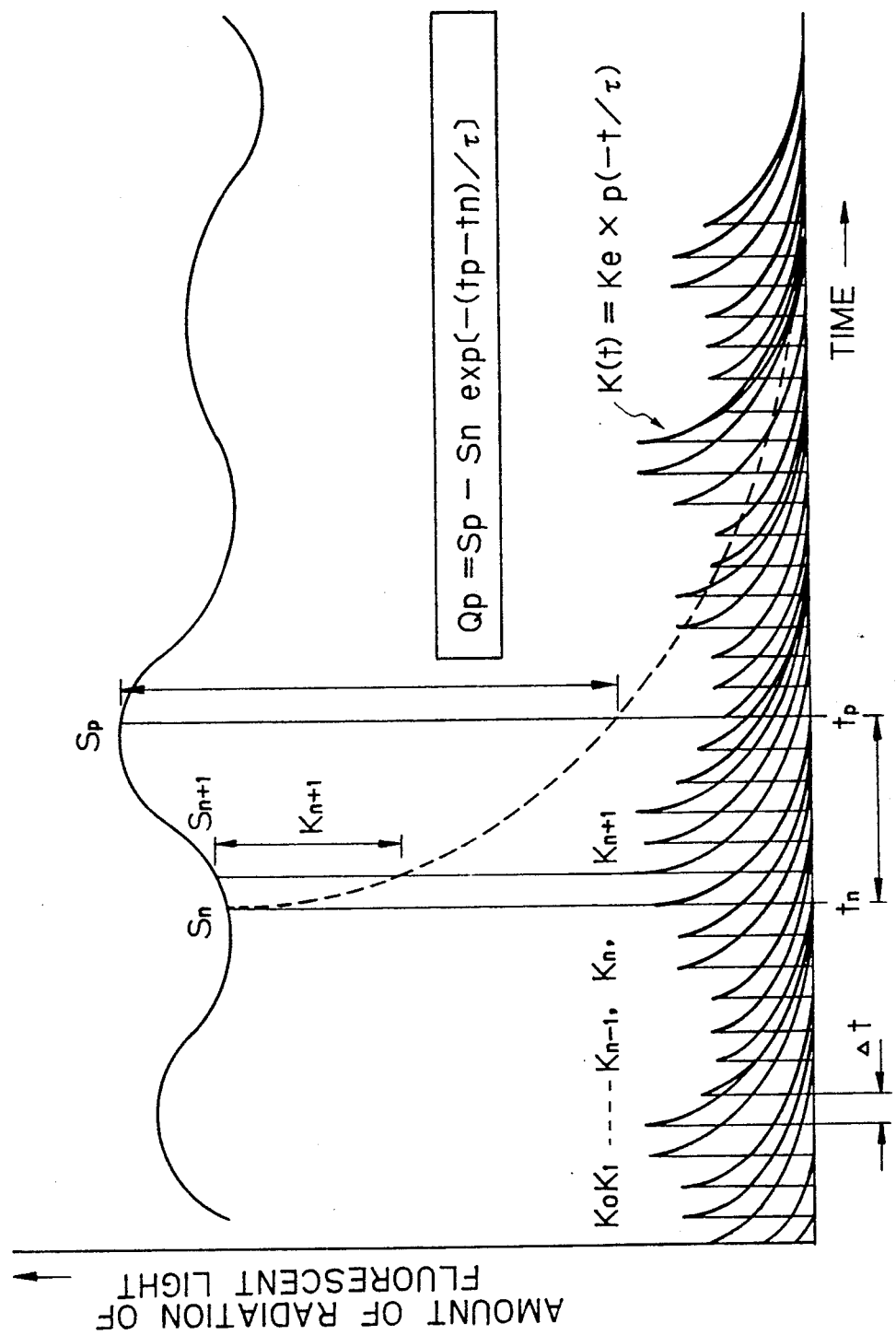
FIG. 5 is a view for explaining the relationship between a fluorescent light and an afterglow thereof.

FIG. 5 is a view for explaining the relationship between the fluorescent light and the afterglow thereof.

After the excitation beam is irradiated onto the picture element of the photostimulable phosphor plate, the excitation beam is moved to the next picture element. In this case, the time at the instant of the irradiation of the laser beam is given by "t=0" and the amount of the fluorescent light at "t=0" is given by "K".

In this case, the amount of the fluorescent light is gradually reduced with a lapse of time. This gradually reducing fluorescent light is called "afterglow". Accordingly, the change of the afterglow with a lapse of time is expressed by the following formula.

$$K(t) = K\, exp(-t/\tau) \ldots \quad (1)$$

where t is a time interval, and $\tau$ is a time constant of an attenuation curve.

For example, when the time constant $\tau$ is 0.8 $\mu$sec, and noise level is $-60$ dB (this value corresponds to 1/1000 of the maximum level of the fluorescent light), the time necessary for reading one picture element is calculated based on the formula (1) as follows.

$$t \approx -2.303\, log\, (1/1000) \times 0.8\; \mu sec \approx 5.5\; \mu sec$$

Further, assuming that number of the picture elements is, for example $4 \times 10^6$ dots in the photostimulable phosphor plate and the radiation efficiency of the fluorescent light is $\eta = 0.7$, the whole time necessary for reading all picture elements is given as follows.

$$T = 5.5\; \mu sec \times 4 \times 10^6 / 0.7 \approx 30\; sec$$

As is obvious from above calculation, a very long time is necessary for reading all picture elements in the conventional art.

Accordingly, the object of the present invention lies in the correction of the afterglow so that it is possible to reduce the read time for the X-ray image. Next, the basic aspect of the present invention will be explained below.

The microprocessor used in the present invention (see, control unit 2.0 in FIG. 6) includes, a sampling means for sampling the amount of the fluorescent light T in the time interval of $\Delta t$, and a calculation means for calculating the correction image value $Q_p$ between $t_n$ and $T_p$ based on the following formula.

$$Q_p = S_p - S_n exp(-(t_p - t_n)/\tau \ldots \quad (2)$$

In FIG. 5, the ordinate denotes an amount of radiation of fluorescent light, and the abscissa denotes a lapse of time. Each of $K_O, K_1, \ldots K_{n-1}, K_n, K_{n+1}$ denotes the amount of the fluorescent light accumulated in each picture element when X-rays are irradiated onto the picture element.

As explained above, when the excitation beam is irradiated onto a picture element, the amount of light $K_n$ is gradually reduced and results in the afterglow. Each occurrence of afterglow is expressed by the curve "$K\, exp(-t/\tau)$" as shown by the formula (1).

Further, when the amount of radiation of the fluorescent light at the time $t_n$ detected by the PMT 3.9 (i.e., the image value as explained above) is expressed by $S_n$, the image value $S_{n-1}$ is given by the following formula.

$$S_{n-1} = K_O exp(-(n-1)t/\tau) + K_1 exp(-(n-2)t/\tau) + \ldots 30\, K_{n-2} exp(-\Delta t/\tau) + K_{n-1} \ldots \quad (3)$$

When the image value of the radiation of the fluorescent light after the time $\Delta t$ is expressed by $S_n$, the image value $S_n$ is given by the following formula.

$$S_n = K_0 \exp(-(n)\Delta t/\tau) + K_1 \exp(-(n-1)\Delta t/\tau) + \quad (4)$$
$$K_{n-1}\exp(-\Delta t/\tau) + K_n$$
$$= S_{n-1}\exp(-\Delta t/\tau) + K_n$$

Accordingly, as shown in FIG. 5, in general, the formula (2) is obtained between the time $t_n$ and $t_p$. As a result, it is possible to correct the influence of the afterglow based on the formula (2).

Figure 6:
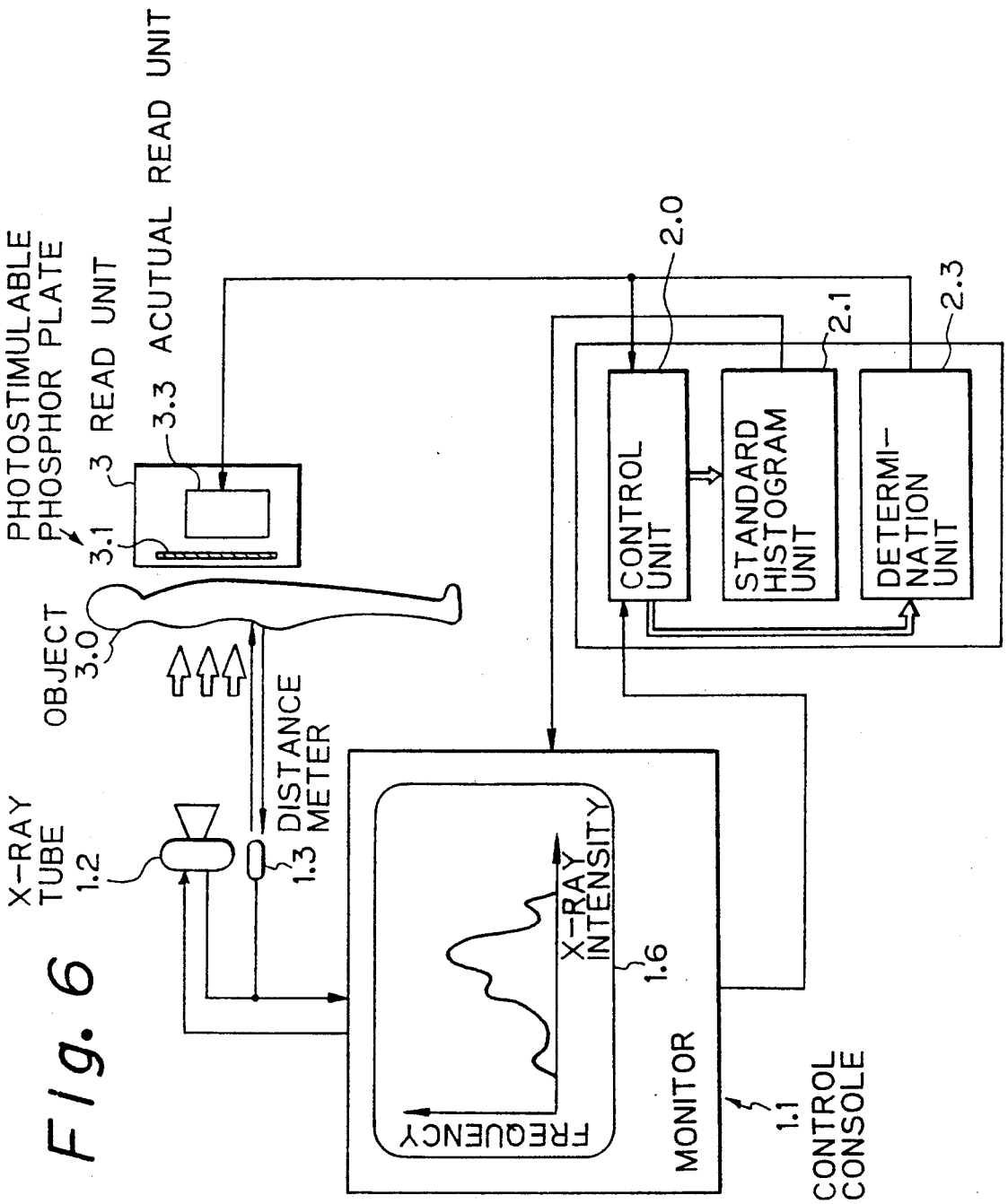
FIG. 6 is a schematic view of an X-ray image read apparatus applying the present invention.

FIG. 6 is a schematic view of an X-ray image read apparatus applying the present invention. In FIG. 6, reference number 1.1 denotes a control console for controlling the supply voltage and current for an X-ray tube, an irradiation time of the X-ray, a multiplication rate of the photomultiplier, an amplification rate of the amplifier, and a distance between the object and the X-ray tube. Further, various calculation commands for the formulas (1) to (4) are input from the control console 1.1.

Further, reference number 1.2 denotes the X-ray tube, 1.3 an ultrasonic distance meter, and 1.6 a monitor image of the X-ray displayed on the CRT. In the drawing, a histogram is shown as one example of the monitor image. Reference number 2.0 denotes a control unit. The control unit 2.0 includes the correction unit 3.13 and a microprocessor (not shown). 2.1 is a standard histogram storage unit for storing various histograms (see, graph in the monitor image), and 2.3 is a determination unit for determining read conditions during the actual read when diagnosing the object. Still further, reference number 3 denotes a read unit, 3.0 an object, 3.1 a photostimulable phosphor plate, and 3.3 an actual read unit.

The above various data are transmitted to the control unit 2.0 as the photographic conditions. Further, the distance data from the distance meter 1.3 is also transmitted to control unit 2.0. The control unit 2.0 selects one of the standard histograms in accordance with the above photographic conditions. This selected standard histogram is displayed on the monitor 1.6. In this embodiment, the selected standard histogram indicating the relationship between the intensity of the X-ray (abscissa) and the frequency thereof (ordinate) is displayed on the monitor 1.6 based on the above photographic conditions.

What is claimed is:

1. A digital X-ray image read apparatus with a correction function, comprising:
    an excitation beam generation source for irradiating an excitation beam onto a photostimulable phosphor plate to generate a florescent light;
    collection means for collecting the florescent light from said photostimulable phosphor plate after excitation;
    photomultipler means, connected to said collection means, for converting the fluorescent light to an analog electrical signal after multiplication;
    an analog-to-digital converter, operatively connected to said photomultipler means, for converting the analog electrical signal to a digital X-ray image signal;
    correction means, operatively connected to said analog-to-digital converter, for correcting the digital X-ray image based on a multiplicative predetermined formula obtained from an amount of the fluorescent light and an afterglow thereof; and
    image storage means, operatively connected to said correction means, for storing the X-ray image after correction.

2. A digital X-ray image read apparatus as claimed in claim 1, wherein said correction means comprises:
    a multiplication unit for multiplying a constant value of $\exp(-\Delta t/\tau)$ by the X-ray image $(S_{n-1})$; and
    a subtraction unit, operatively connected to said multiplication unit, for subtracting the resultant data $S_{n-1} \exp(-\Delta t/\tau)$ from the X-ray image $(S_n)$ just after the X-ray image $(S_{n-1})$, and obtaining the corrected X-ray image $(Q_n)$ based on the following formula:

$$Q_p = S_p - S_n \exp(-t_p - t_n)/\tau)$$

where $(t_n - t_p)$ denotes a time interval of sampling.

* * * * *